United States Patent

Ban

[15] 3,677,557

[45] July 18, 1972

[54] ENDLESS MAGNETIC TAPE CARTRIDGE REMOVING APPARATUS

[72] Inventor: Itsuki Ban, 829 Higashi-Oizumimachi, Nerima-ku, Tokyo, Japan

[22] Filed: March 30, 1970

[21] Appl. No.: 23,537

[52] U.S. Cl. .....274/4 B
[51] Int. Cl. .....G11b 5/00
[58] Field of Search .....274/4, 11

[56] References Cited

UNITED STATES PATENTS

| | | | |
|---|---|---|---|
| 3,489,417 | 1/1970 | Harper | 274/4 B |
| 3,492,005 | 1/1970 | Veno et al. | 274/4 B |
| 3,575,421 | 4/1971 | Kato | 274/4 B |

*Primary Examiner*—Harry N. Haroian
*Attorney*—Jacobs & Jacobs

[57] ABSTRACT

An apparatus moving a cartridge to and from a play position in a tape cartridge player comprising a displaceable member supporting a retension member which is engageable with a notch in the cartridge and which exerts a forward force to the cartridge for holding the cartridge in the play position with respect to the capstan and the magnetic head, and means for moving the displaceable member to the position where the retention member escapes from the notch of the cartridge, the cartridge being removed from the play position as said forward force on the cartridge is extinguished by the retention member escaping from the notch of the cartridge.

10 Claims, 5 Drawing Figures

Patented July 18, 1972 3,677,557

2 Sheets-Sheet 1

ENDLESS MAGNETIC TAPE CARTRIDGE REMOVING APPARATUS

BACKGROUND OF THE INVENTION

This invention relates to an endless magnetic tape cartridge player, and more particularly to a novel apparatus for removing a cartridge from its operating position in the player.

Generally, the endless magnetic tape cartridge is manually inserted in the tape cartridge player and is then engaged in a play mode. It has been well known heretofore to use a notch provided in the cartridge side to retain the cartridge in the play mode. More specifically, the inclined wall of the notch is pressed by a spring-pressed roller to exert the forward force to the cartridge thereby urging the cartridge in the operative position with respect to the tape driving capstan. In order to stop the play of the cartridge which has been held in the operative position in the manner as mentioned, the cartridge is usually manually removed from the operating position against the forward force derived from the spring pressed roller. Termination of the cartridge play is conventionally made automatic, rather than manual, by using a solenoid with a plunger and the drive force thereof to remove the cartridge directly from the operating position. However, disadvantage derived from this is that pressure contact between the pinch roller within the cartridge and the tape driving capstan requires 1 to 2 kg in term of weights, and that removal of the cartridge to the operative position requires more force. In addition, since frictional force acts between the cartridge and the player deck, the solenoid to be used would be large-scaled and expensive and require about 50 watts to be consumed. In the use of a large-sized solenoid, an impactive large sound is generated which will adversely affect accoustic instruments. Further, such solenoid requires large electric power to be consumed and is then not suitable for the use in the tape cartridge player based on an electric battery as source.

SUMMARY OF THE INVENTION

It is a primary object of the invention to provide an endless magnetic tape cartridge removing apparatus for a tape cartridge player wherein a retention roller which exerts a forward force to the cartridge by pressing the inclined wall of the notch in the cartridge side is retracted from the notch whereby the cartridge is removed from the operative position with respect to the capstan and magnetic head.

Another object of the invention is to provide an endless magnetic tape cartridge removing apparatus for a tape cartridge player wherein a displaceable member is moved in relation to rotation of an eccentric frictional wheel which is provided with the retention roller and is selectively urged and rotatably driven by the capstan.

A further object of the invention is to provide an endless magnetic tape cartridge removing apparatus for a tape cartridge player wherein the retention roller is held by the displaceable member by means of an electromagnet device in the position where the roller presses the notch in the cartridge, and the retention roller is retracted from the notch in the cartridge when the electromagnet device is disengaged from the displaceable member due to action of a control circuit to thus extinguish contact pressure between the pinch roller within the cartridge and the capstan to substantially remove the cartridge from its operative position.

Still another object of the invention is to provide an endless magnetic tape cartridge removing apparatus for a tape cartridge player wherein the cartridge is removed from the operative position in relation to the fact that a pushbutton switch is manually and depressedly operated or an endmark detector detects a conductive patch on the tape.

According to the invention, there is advantage that not only the above mentioned defect is eliminated since movement of the cartridge is indirectly made by the solenoid but also the solenoid is used as a trigger so that it can be of a small size and it requires less electric power to be consumed. Moreover, the displaceable member is moved by a rotational force of the capstan whereby a relatively strong force may be obtained to move the displaceable member.

These and other objects of the invention will be apparent from the following description and accompanying drawing in which:

DESCRIPTION OF THE PREFERRED EMBODIMENTS

Figure 1:
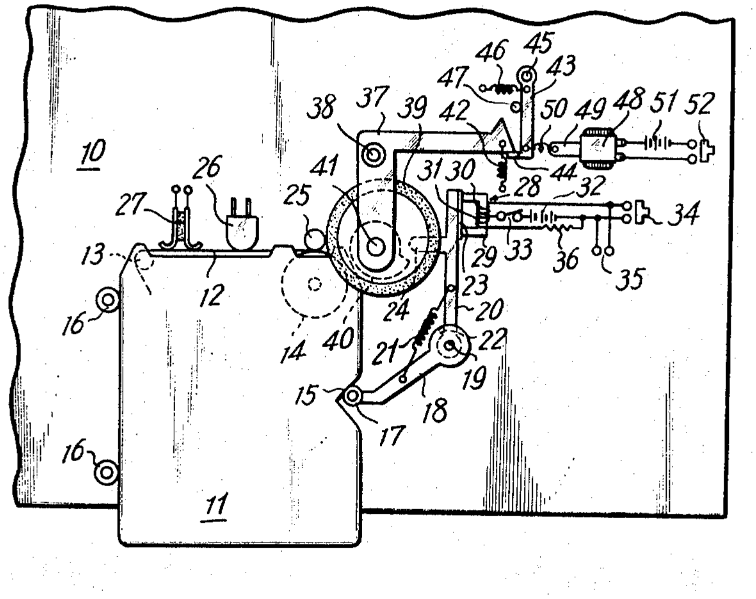
FIG. 1 is a representation schematically showing an embodiment of an endless magnetic tape cartridge removing apparatus for a tape cartridge player.

Referring now to FIG. 1, a tape cartridge player in which is mounted an embodiment of an endless magnetic tape cartridge removing apparatus according to the present invention, is partially shown as including a flat deck 10. Much of the mechanism disposed beneath the deck 10 is omitted since it forms no part of the invention. An endless magnetic tape cartridge 11 of the type employed in the tape cartridge player includes a generally rectangular container with a centrally disposed reel (not shown) on which an endless magnetic tape 12 is wound and unwound in conventional manner. The tape 12 passes over a tape guide 13 and a pinch roller 14. The guide 13 and the pinch roller 14 are disposed adjacent the leading edge of the cartridge whereat the cartridge side wall is cut away or disposed with and the tape 12 is extended from the center of the hub of the reel about the guide 13 and thence about the pinch roller 14 back to the outer periphery of a roll formed by the tape wound about the hub. The cartridge 11 further includes a notch 15.

Mounted to the deck 10 are guide rollers 16 and 17 which are spaced away from each other and provides a way for the cartridge 11. One guide roller 17 is substantially secured to the deck 10 whereas the other guide roller 17 is mounted to a free end of lever 18 of which one end is pivoted to a pivot pin 19 mounted to the deck 10. The guide roller 17 is thus adapted to change its position by swingable movement of the lever 18. The lever is connected by a spring 21 to a substantially T-shaped lever 20 one end of which is pivoted to the pivot pin 19. The lever 18 is given by the bias of the spring 21 rotational force in the direction by which an angle formed between the lever 18 and the lever 20 is reduced, however, a pin 22 connected to the lever 18 thereunder engages the lever 20 at the margin thereof to prevent such angle from being reduced more than a predetermined angle. A capstan 25 is rotatably supported by a suitable bearing (not shown) at the lower side of the deck 10 and is driven from an electric motor (not shown) at the lower side of the deck. The capstan 25 extends through a hole (not shown) formed on the deck 10. Alongside of the capstan 25 is a magnetic head 26 and adjacent the head and in line therewith is an endmark detection or search means 27. The endmark detector 27 consists of two feeler contacts that are shorted by conductive patch or endmark (not shown) provided on the tape 12 within the cartridge 11 and member of insulation for supporting the contacts. An electromagnetic device 28 is connected on the deck 10. The electromagnetic device is provided to lock the lever 18 by attracting a magnetic piece 23 firmly mounted to the lever 20 at the free end thereof. The electromagnetic device 28 is constituted by a core 29 having the first and second coils 30, 31. The first coil 30 is connected to a power source 32 through a normally-opened switch 33 and a pushbutton switch 34. The endmark detector 27 is connected through terminals 35 in parallel with switch 34 mounted on the deck 10 at the lower side. The switch 33 is provided to the deck 10 at the lower side thereof and a actuator (not shown) of the switch passes through a hole (not shown) on the deck to slightly expose itself on the deck. The actuator is actuated by the cartridge when inserted into the cartridge tape player and appearing on the deck. More specifically, the switch 33 is closed in response to insertion of the cartridge 11 for play into the magnetic tape player. The second coil 31 is connected to the power source 32 through the switch 33 and a resistor 36. Where the switch 33 is closed by actuation of the cartridge 11, a relatively weak current is applied from the power source 32 through the resistor 36 to the second coil 31. In this instance, the intensity of the magnetic flux generated in the second coil 31 is so adapted that it can attract intensely and engage with the magnetic piece 23 on the lever 20 only when the open end of the magnetic circuit of the core 29 is closed by the magnetic piece, and it cannot attract the magnetic piece 23 when the magnetic piece 23 is away from the core 29. The current from power source 32 is applied to the first coil 30 to produce the magnetic flux when the pushbutton switch 34 is manually operated and closed or when the feeler contacts for the endmark detector 27 are shorted by the endmark (not shown) on the tape 12. The direction in which the current is applied to the first coil 30 is determined so that the magnetic flux generated in the first coil 30 erases the magnetic flux produced in the second coil 31. Accordingly, in response to depressive operation of the pushbutton 34, the electromagnetic device 28 is released from the lever 20.

A mechanism or means for moving the lever 20 to the position where it is engaged by the electromagnetic device 28 includes a swing lever 37 pivoted to a pivot pin 38 connected on the deck 10. A rubber covered frictional wheel 39 is eccentrically journaled to a pivot 41 connected to the swing lever 37 at one end thereof. A cam 40 is connected by a suitable means to the frictional wheel 39 and journaled to the pivot 41. The cam 40 is provided below the frictional wheel 39. A space provided between the cam 40 and the deck which is wider than the thickness of the cartridge 11. The frictional wheel 39 as will be described later is caused to abut against the capstan 25 by rotation of the swing lever 37 from the position as shown to the clockwise direction and is rotatably driven by the capstan 25. The swing lever 37 is given clockwise rotational force by a spring 42, but rotation of the swing lever by the spring is prevented by a latch lever 43 engageable with the swing lever at one end portion thereof. The latch lever 43 has one end journaled to a pivot pin 45 connected on the deck 10 and the free end shown as a bent portion 44 for engaging the swing lever 37. The latch lever 43 is biased by a spring 46 in the direction for maintaining an engagement relation with the swing lever 37, however movement of the latch lever 43 by the spring 46 is limited by a stopper pin 47 on the deck 10. The latch lever 43 is connected by a spring 50 to a plunger 49 for a solenoid 48 which is fixed by a suitable means on the deck. The solenoid 48 is connected by a pushbutton switch 52 to a power source 51. When the pushbutton switch 52 is depressedly operated, the solenoid 48 is energized by the power source 51 to allow the plunger 49 to swing the latch lever 43 against the bias of the spring 46 to the position where the latch lever 43 is disengaged from the swing lever 37.

FIG. 1 shows the cartridge 11 when held in the operating position where the lever 20 is engaged by the electromagnet device 28 and the roller 17 on the lever 18 is pressed into the notch 15 on the side of the cartridge 11 under the influence of the spring 21. The force exerted by the roller 17 against the inclined wall of the notch 15 in the side of the cartridge 11, in cooperation with the guide rollers 16, urges the cartridge 11 forwardly whereby the cartridge is held in the operating position where the pinch roller 14 is strongly pressed by the capstan 25. With the cartridge being held in the operating position, the tape 11 is caused to drivingly run across the endmark detector 27 and the magnetic head 26 by cooperation of the capstan 25 and the pinch roller 14.

When the pushbutton switch 34 is depressedly operated and closed or the feeler contacts for the endmark detector 27 are shorted by the conductive patch (not shown) on the tape 12 in order to terminate the play of the cartridge 11, the current is drained to the first coil 30 for the electromagnet device 28 to allow the latter to disengage the lever 20, as previously mentioned. Therefore, the levers 18 and 20 are swung to the position where the roller 17 is removed from the notch 15 on the side of the cartridge the force by which the cartridge 11 is forwardly biased is caused to cease, and the cartridge 11 is automatically removed to the non-operating position where the abutment force between the capstan 25 and the pinch roller 14 decays. As a result, running of the tape 12 is stopped to terminate the cartridge play. When the cartridge 11 which is removed to the non-operating position is drawn out from the tape player by hand, the side wall of the cartridge 11 frictionally engages the roller 17, however, extraction of the cartridge 11 is made by only the slightest force since the levers 18 and 20 are counterclockwise swung. From this, it will be understood that another cartridge can be readily inserted, without requiring much force, into the tape player for the cartridge play.

After the cartridge 11 is in the condition in which it is moved to the non-playing position or another cartridge is inserted to the non-playing position, the pushbutton switch 52 is depressedly operated to energize the solenoid 48 by means of the power source 51 so that the latch lever 48 is swung to the position where the swing lever 37 is released therefrom. As a result, the swing lever 37 is slightly swung in the clockwise direction to allow the frictional wheel 39 to abut against the capstan 25 and then to be rotatably driven. Since the frictional wheel 39 is eccentrically journaled to the pin 41, rotation of the wheel 39 causes the swing lever 37 to be gradually swung in the counterclockwise direction against the bias of the spring 42. When the frictional wheel 39 is substantially half rotated from the position as shown, the swing lever 37 is critically swung in the counterclockwise direction, and thereafter further rotation of the frictional wheel permits the swing lever 37 to be reversedly and clockwise swung. Immediately before the frictional wheel 39 is rotated through a turn, the end of the swing lever 37 engages the latch lever 43 so that further swinging of the swing lever is prevented. Rotation of the frictional wheel 39 through a turn extinguishes abutment force by the bias of the spring 42 between the frictional wheel 39 and the capstan 25 to arrest rotation of the frictional wheel 39 since the swing lever has been engaged by the latch lever 43. During rotation of the frictional wheel 39 through a turn, the cam 40 is also rotated through a turn. In the course of rotation of the cam through a turn, the cam 40 is engaged by the lever 20 at the tip end of the arm 24 thereof to swing the lever 20 to the position where the lever 20 is attracted and engaged by the electromagnet device 28. With swing movement of the lever 20, the lever 18 is clockwise swung to allow the roller 17 to be received within the notch 15 of the cartridge 11 to press the inclined wall of the notch. Consequently, the cartridge 11 is moved to the operating position, and is held in the operating position as long as the lever 20 engages the electromagnet device 28.

As stated in the foregoing, operation of the pushbutton switch 52 moves the cartridge 11 to the operating position whereas operation of the pushbutton switch 34 automatically removes the cartridge from the operating position.

Figure 2:
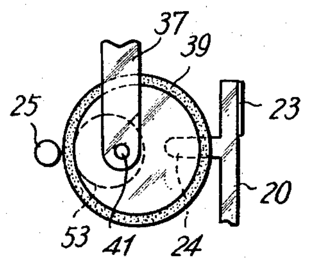
FIGS. 2 and 3 are representation schematically showing modified forms of the cam shown in FIG. 1.
Figure 3:
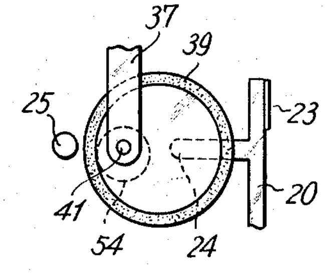

The cam 40 which is rotated synchronously with the frictional wheel 39 may be replaced by an eccentric cam 53 as shown in FIG. 2 in which a portion offset from the center of the circular cam 53 is journaled to the pin 41 on the swing lever 37. Alternatively, the cam 40 may be replaced by a circular member 54 (FIG. 3) less eccentrically journaled to the pin 41 on the swing lever if the frictional wheel 39 (FIG. 1) is journaled to the pin 41 a little more offset from the center to increase swing volume of the swing lever. Like reference numerals in FIG. 1 designate like or corresponding parts throughout FIGS. 2 and 3.

Figure 4:
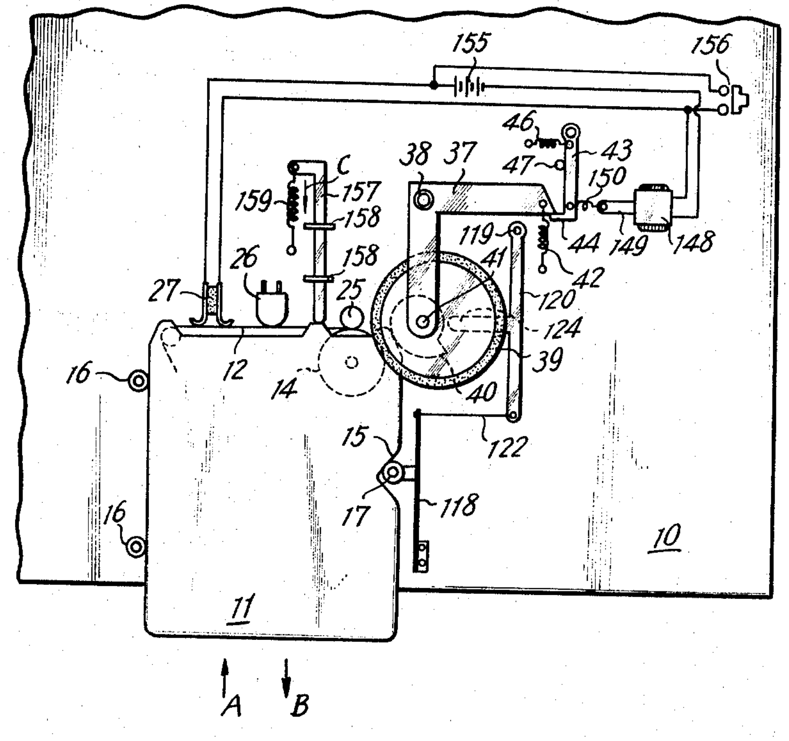
FIG. 4 is a schematic view of another embodiment of the endless magnetic tape cartridge removing apparatus for a tape cartridge player.

FIG. 4 shows another embodiment of the tape cartridge removing apparatus according to the invention, wherein similar numerals are used to illustrate like parts in FIG. 1.

As previously mentioned, the roller 17 is provided to press the inclined wall of the notch 15 on the side of the cartridge 11 for holding the cartridge in the operating position. In this instance, the roller 17 is provided to a leaf spring 118 one end of which is mounted to the deck 10. The leaf spring 118 has the free end connected by a connecting member 122 such as piano wire to a lever 120 at the free end thereof. The lever 120 has the other end pivoted to a pivot pin 119 connected to the deck 10. The lever 120 is also provided at mid-portion thereof with an arm 124 of which one end is opposed to the cam 40. The latch lever 43 for retaining the swing lever 37 and the cam 40 against the bias of the spring 42 is connected by a spring 150 to a plunger 149 for a solenoid 148 fixed by a suitable means to the deck 10. The solenoid 148 is connected through the endmark detector 27 or a pushbutton switch 156 to a power source 155. More specifically, the solenoid 148 is energized when either a pair of feeler contacts for the endmark detector 27 is shorted by the conductive patch (not shown) on the tape 12 or the push button switch 156 is manually operated and closed. A substantially L-shaped slide lever 157 is slidably supported by guides connected to the deck 10 to engage at its one end the leading edge of the cartridge 11 to be received in the tape player. The slide lever 157 is normally biased by a spring 159 in the direction of the arrow C.

The cartridge 11 is shown in FIG. 4 as being manually inserted in the direction of the arrow A and held in the operating position, and the roller 17 is caused to press the inclined wall of the notch 15 by the bias of the leaf spring 118. With insertion of the cartridge 11 in the direction of the arrow A, the end of the slide lever 157 is pressed by the leading edge of the cartridge and is moved against the bias of the spring 159. The spring 159 has the elasticity that is more weaker than a force by which the roller 17 presses the inclined wall of the notch 15. Thus, the slide lever 157 presses the leading edge of the cartridge 11 held in the operating position under the bias of the elasticity of the spring 159 but the cartridge 11 is not removed from the operating position as long as roller 17 is engaged in notch 15.

With the cartridge 11 being held in the operating position, the pinch roller 14 abuts against the capstan 25 over the tape 12 to allow the tape to operatively run across the magnetic head 26. During travel of the tape 12 if the conductive patch (not shown) on the tape 12 shorts a pair of feeler contacts for the endmark detector 27 or the pushbutton switch 156 is manually operated and closed, the solenoid 148 is energized by the power source 155. Energization of the solenoid 148 moves the latch lever 43 to the position where it is disengaged from the swing lever 37 and thus the swing lever 37 is clockwise swung by the elasticity of the spring 42 so that the eccentric frictional wheel 39 abuts against the capstan 25 and is then rotatably driven. The frictional wheel 39 is rotated through a turn as previously mentioned by reference to FIG. 1 to permit the swing lever 37 to engage the latch lever 43 thereby preventing rotation of the frictional wheel 39. As the frictional wheel 39 is rotated through a turn, the cam 40 is also rotated through a turn at which time the end of the arm 124 of the lever 120 is in contact with the cam 40 to gradually swing the lever 120 in the counterclockwise direction. Counterclockwise swing movement of the lever 120 flexes the leaf spring 118 by means of the connecting member 122 to allow the roller 17 to escape from the notch 15 in the cartridge side. As a result, the cartridge 11 is removed from the operating position in the direction of the arrow B as the leading edge thereof is pressed by the slide 157 under the elasticity of the spring 159. As the cam 40 is rotated to keep the maximum deformed portion thereof away from the end of the arm 124 of the lever 120, the minimum deformed portion is caused to be opposed to the end of the arm whereby the lever 120 is clockwise, returnedly swung by the bias of the leaf spring 118. In order to repeatedly play the cartridge 11 which has been removed from the operating position by the slide lever 157, the cartridge 11 is manually depressed in the direction of the arrow A to allow the roller 17 to be received in the notch 15 of the cartridge 11 to position the cartridge in the operating position.

When the endmark detector 27 detects the endmark (not shown) on the tape 12 or the pushbutton switch 156 is manually and depressedly operated, the roller 17 automatically escapes from the notch 15 in the cartridge side while the cartridge is removed to the operating position by the slide lever 157 so that the cartridge may be drawn out of the tape cartridge without requiring any force.

Figure 5:
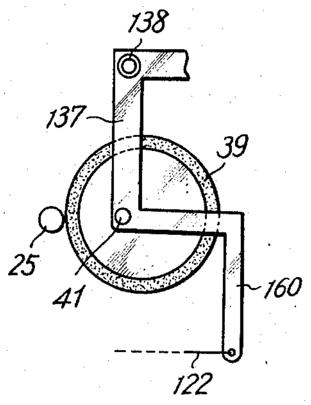
FIG. 5 is a representation schematically showing a modified form of the swing lever shown in FIG. 4.

While the frictional wheel 39 is rotated through a turn, the swing lever 37 is swung so that, for instance, a swing lever 137 with a crank shaped extension 160 may be employed, as shown in FIG. 5, instead of the swing lever 37, to carry the leaf spring 118 connected to the lever 137 by the connecting member 122 at the end of the extension 160 so that the cam 40 and the lever 120 need not be used. It is noted that like numerals are used in FIG. 5 to designate like parts in FIG. 4. Although FIG. 5 does not show all details of the swing lever 137, it is noted that the swing lever 137 is similar to the swing lever 37 and is pivoted to a pivot pin 138 and then biased by a spring (not shown) in the clockwise direction.

Although the invention has been described with reference to specific embodiments, it is apparent that the invention is not to be limited to the embodiments as illustrated, and, accordingly, changes and variations may be made without departing from the spirit and scope of the invention as defined in the appended claims.

What is claimed is;

1 An apparatus for removing a tape cartridge from a tape cartridge player having a deck, tape driving means having a capstan rotatably supported on the deck, and a magnetic head supported on the deck, the cartridge having a notch in a side thereof, comprising:

cartridge retaining means for urging a cartridge inserted in the player toward the play position with respect to the capstan and the magnetic head and for releasably holding the cartridge in the play position, said cartridge retaining means comprising a retention member for engaging the notch in the cartridge, and a displaceable member coupled to said retention member for positioning the retention member with respect to said notch of said cartridge and for exerting, through said retention member, a forward force on said cartridge to urge the cartridge to and hold the cartridge in the play position;

a lever member connected to the displaceable member for controlling the positioning of said retention member; an electromagnet device for magnetically retaining the lever member in a predetermined position;

control circuit means for controlling actuation of the electromagnet device, said control circuit means including a push button switch operable when manually closed to release the magnetic retention of the lever member by the electromagnet device;

a spring member connected between the displaceable member and said lever member for urging said displaceable member in the direction where said retention member is moved into said notch of said cartridge when the lever member is retained by the electromagnet device, said spring member being capable to move the lever member away from the predetermined position where the latter is engaged by the electromagnet device to a second position when the electromagnet device is caused to release retention of the lever member in response to closing of the push button switch, the lever member being operable when moving away from said predetermined position toward said second position to move the displaceable member to a position where said retention member does not press against said notch of said cartridge to thereby extinguish said forward force by which said cartridge is held in said play position thereby removing said cartridge from said play position;

means for engaging the lever member with the electromagnet device including a swing lever movably provided on said deck, a frictional wheel mounted for eccentric rotation about a shaft carried by said swing lever, a second spring member biasing said swing lever in the direction in which said frictional wheel abuts against said capstan, lock means for locking said swing lever in a locked position where said frictional wheel does not abut against said capstan, release means for unlocking said lock means, and a rotary member rotatable in synchronism with said frictional wheel and arranged to be adjacent said lever member when said lever member is in said second position, said swing lever being operable, when said lock means is unlocked, to swing said frictional wheel into abutment against said capstan under the bias of said second spring member and thereby cause said frictional wheel to be eccentrically driven by said capstan through a turn, said lock means being operable to lock said swing lever in said locked position when said frictional wheel has completed a turn to stop further rotation of said frictional wheel, said rotary member being operable to move the lever member from said second position to the predetermined position where the latter is engaged by the electromagnet device while said frictional wheel is being rotated through a turn.

2 An apparatus in accordance with claim 1 wherein said control circuit means includes an endmark detector provided on said deck for producing a signal in response to detection of a conductive patch on the tape, and said electromagnet device being operable to be released from said lever member in response to said signal.

3 An apparatus in accordance with claim 1 wherein said rotary member is a cam.

4 An apparatus for removing a tape cartridge from a tape cartridge player having a deck, tape driving means having a capstan rotatably supported on the deck, and a magnetic head supported on the deck, the cartridge having a notch in a side thereof, comprising:

cartridge retaining means for urging a cartridge inserted in the player toward the play position with respect to the capstan and the magnetic head and for releasably holding the cartridge in the play position, said cartridge retaining means comprising a retention member for engaging the notch in the cartridge, and a displaceable member coupled to said retention member for positioning the retention member with respect to said notch of said cartridge and for exerting, through said retention member, a forward force on said cartridge to urge the cartridge to and hold the cartridge in the play position, said displaceable member being biased by spring force in the direction in which said retention roller presses said notch of said cartridge; moving means for moving the displaceable member against said elastic force to a position where said retention member escapes from said notch of said cartridge in said play position, said moving means including a swing lever movably provided on said deck, a frictional wheel mounted for eccentric rotation about a shaft carried by said swing lever, a spring member biasing said swing lever in the direction in which said frictional wheel abuts against said capstan, lock means for locking said swing lever in a locked position where said frictional wheel does not abut against said capstan, and release means for unlocking said lock means, said swing lever being operable, when said lock means is unlocked, to swing said frictional wheel into abutment against said capstan under the bias of said spring member and thereby cause said frictional wheel to be eccentrically driven by said capstan through a turn, said lock means being operable to lock said swing lever in said locked position when said frictional wheel has completed a turn to stop further rotation of said frictional wheel, and said moving means including means operated by eccentric rotation of said frictional wheel for moving the displaceable member to the position where said retention member escapes from said notch of said cartridge in said play position.

5 An apparatus in accordance with Claim 4 wherein said displaceable member is connected by a connecting member to said swing lever, said displaceable member being moved by the connecting member with swing movement of said swing lever.

6 An apparatus in accordance with Claim 4 wherein said displaceable member is swingably mounted on said deck and said means operated by eccentric rotation of said frictional wheel for moving said displaceable member includes a swingable lever mounted on said deck and having a free end, a connecting member connected between the free end of the lever and the displaceable member, a cam member rotatable with and connected to said frictional wheel, said lever having an arm adjacent said cam, said displaceable member being moved through said cam member, said lever, and said connecting member as said frictional wheel is rotated.

7 An apparatus in accordance with claim 4 wherein said lock means comprises a latch lever swingably provided on said deck, and a bias member biasing said latch lever to the position where the former engages said swing lever.

8 An apparatus in accordance with claim 7 wherein said release means comprises a solenoid having a plunger coupled to said latch lever, and a control circuit means for controlling a supply of current to said solenoid, said control circuit including a power source, and a pushbutton switch connected in series with said power source and said solenoid and operable to be closed by manual operation, and said solenoid being operable when energized by said power source to cause said plunger to move said latch lever so as to effect disengagement with said swing lever in response to closing of said pushbutton switch.

9 An apparatus in accordance with Claim 8 wherein said control circuit means includes an endmark detector provided on said deck and having a pair of normally open feeler contacts connected in parallel with said pushbutton switch, and said solenoid being energized from said power source when said feeler contacts are shorted by a conductive patch on the tape.

10. An apparatus according to claim 4, wherein a slide member is mounted on said deck arranged to engage the leading edge of a cartridge in the play position and being biased by spring force in the direction in which the slide member engages the cartridge, said slide member being operable to move the cartridge away from the play position after the retention member has escaped from the notch in said cartridge.

* * * * *